Aug. 30, 1932. J. B. CAMPBELL Re. 18,582
FLOOR COVERING
Original Filed Dec. 10, 1925
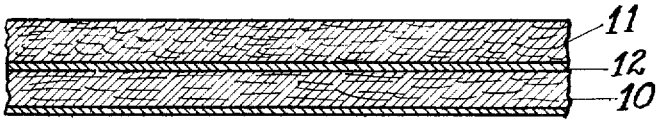
INVENTOR.
John B. Campbell
BY
Allen & Allen
ATTORNEYS Reissued Aug. 30, 1932

Re. 18,582

UNITED STATES PATENT OFFICE

JOHN B. CAMPBELL, OF SALEM, NEW JERSEY, ASSIGNOR, BY MESNE ASSIGNMENTS, TO CARTHAGE MILLS, INCORPORATED, OF CINCINNATI, OHIO, A CORPORATION OF OHIO

FLOOR COVERING

Original No. 1,766,879, dated June 24, 1930, Serial No. 74,476, filed December 10, 1925. Application for reissue filed June 14, 1932. Serial No. 617,234.

My present invention relates generally to a floor covering and more particularly to a floor covering which possesses the characteristics both of a carpet and also of a felt base product.

Before proceeding to describe my invention, I will premise that the felt base generally used for the manufacture of floor covering such as oil cloth, is made from a pulped mass of appoximately 50% rag content and of 50% paper content which is rolled into sheets and then saturated with a saturant such as asphaltum, the excess saturant being pressed out in any preferred or desired manner. A saturated felt of this character has the following characteristics: (1) it has body, (2) it will tend to flatten out and cling to the floor and to remain so during use, (3) it is waterproof due to the character of the saturant used, (4) it is moth and insect proof, also due to the character of the saturant employed. It is these characteristics of a saturated felt which give such felt base value as a floor covering, for which purpose the upper surface thereof is then given one or more ornamental wearing coats which converts the saturated felt into the well-known oil cloth of commerce used for floor covering.

Such a floor covering lacks the characteristics of a carpet in that it is cold and unyielding and does not permit of a penetration of the ornamentation very much beyond the surface so that such floor covering will show wear quickly because of the wearing away of the ornamental top wearing surface. In addition it does not possess very high wearing characteristics.

A carpet on the other hand is generally not only expensive but also due to its lack of body and its tendency to curl, objectionable in use, particularly in places where a cheaper type of floor covering is desirable as in kitchens, bath rooms, hall ways, etc.

One of the important objects of my invention is such an association of a felt base of the character hitherto used for oil cloth with a top surface possessing all the characteristics of a carpet so that the floor covering so produced will possess the characteristics of both.

The general object of my invention is the provision of an inexpensive, attractive, and yieldable floor covering possessing all the advantages of both the carpet type and the oil cloth type.

For the attainment of these objects and such other objects as may hitherto appear or be pointed out, I have illustrated an embodiment of my invention in the drawing, wherein:

The figure of the drawing shows in vertical cross-section the detail construction of my new floor covering.

Upon viewing the drawing, it will be observed that at 10, I show a thin sheet of saturated felt of commerce generally employed for the purpose of making oil cloth floor covering and which is in sheet form and is sheeted from a pulp made up of paper and rags, the felt base of commerce for this purpose being generally made up of approximately 50% of paper and 50% of rag.

This sheeted felt base is then passed through a saturated bath, generally of asphaltum, to thoroughly impregnate the sheet therewith, the excess saturant being forced out under pressure. Such a sheet as already stated, possesses certain advantageous characteristics, among which are, its cheapness, its body, its wearing characteristics taking into consideration its cost, its tendency to flatten out and cling to the floor and also the action of the asphaltum saturant to render the floor covering waterproof and also insectproof.

In accordance with my invention, I employ a sheet 10 of this character to form the lower part of my floor covering and associate therewith as the upper part thereof, a sheet 11 which is preferably an unsaturated felt product in sheet form and made 100% rag fibre, and I fixedly associate this sheet of high-grade felt 11 with the saturated felt sheet 10 as by employing a binder 12 therebetween which may also be asphaltum.

This I do by depositing this binder 12 directly upon the upper surface of the saturated felt sheet 10 and then positioning the upper felt sheet 11 therewith under pressure. This I have found will produce a bond between the two and which because of the peculiar characteristics inherent in each will make the two, one integral structure.

It will be understood however that it may not be necessary to employ the additional binder 12 because the state of saturation of the sheet 10 may be such as to permit of a bond between the sheets 10 and 11 upon their being pressed together as the excess of asphaltum that may be contained in the sheet 10 may be forced therefrom upon such pressure or may be located on the upper surface thereof.

The top felt sheet 11 may be given the characteristic ornamentation of a carpet in a number of ways. Where a solid colored carpet is desired, the dye which is preferably an aniline one, is incorporated with the fibers or particles making up the sheet 11 either prior to or during the formation of such sheet or the aniline dye can be applied thereto by impregnation or otherwise after the sheet 11 has been formed and before it is associated with the lower sheet 10, or where desired or found advantageous, the dye can be applied to the sheet 11 after it is associated and bound to the lower sheet 10.

Where it is desired to apply a pattern design to the carpet I have found it advisable to employ a process, such as the roll printing process particularly adaptable for the use of the application of aniline dyes and to apply the aniline dyes after the sheet 11 has been formed and either before or after its association of bonding to the sheet 10.

The lower surface of the saturated felt sheet 10 is coated in any preferred or desired color so as to still further waterproof this lower surface and at the same time give to this lower surface a protecting coating. This may be done either during the process of manufacture of the sheet 10 or after its manufacture and before it is associated with the sheet 11, or even after the sheets 10 and 11 are bound together to form the floor covering.

It will be understood that the floor covering above described can be employed either in the form of carpet rugs or runners and that the detailed process of manufacture will necessarily accommodate itself, both as to the size of the material and the character of ornamentation, to the purposes for which the floor covering is to be used.

Having thus described my invention and illustrated its use, what I claim as new and desire to secure by Letters Patent, is:

1. The process of making a carpet floor covering which includes the association of superposed layers, one of which is a dry felt product containing rags as an element to an extent of more than 60%, and the other of which contains rags to an extent of less than 60%.

2. The herein described method of making a floor covering, which includes saturating a fibre base sheet with a viscous relatively heavy binding material to impart body to the base, squeezing out the excess binding material to an extent which imparts only a remaining surface stickiness to the base, and applying to the base for adhesion therewith by virtue of said stickiness a layer of unsaturated rag fibre material, whereby the base will impart to the finished covering weight and flexibility and whereby the unsaturated layer will impart thereto a resemblance to the exposed surface of woven carpet 3. The herein described method of making a floor covering, which includes saturating a fibre base comprising equal parts of paper and rag fibre with asphalt to impart body to the base, and adhesively applying to the base an ornamented unsaturated layer of material comprising pure rag fibre.

4. A carpet floor covering comprising adhesively associated layers of relatively heavy saturated unornamented fibrous material and relatively light unsaturated ornamented fibrous material, the former comprising equal parts of paper and rag fibre saturated with asphalt, and the latter comprising pure rag fibre.

5. A carpet floor covering comprising a weighted unwoven base, a layer of adhesive material thereover, and an unweighted felted rag fibre covering, associated thereover, whereby the latter will resemble the exposed surface of woven carpet and the base will impart weight and flexibility to the floor covering.

6. A carpet floor covering comprising superposed layers, the lower of which is a saturated felt containing less than 60% of rag content and the upper of which is an unsaturated felt made up substantially wholly of rag fibre.

7. A carpet floor covering comprising a weighted base and an unweighted, felted fiber covering associated therewith, whereby the latter will resemble the exposed surface of woven carpet and the base will impart weight and flexibility to the floor covering.

8. A carpet floor covering comprising a weighted waterproofed base layer and an unweighted, felted fiber layer associated thereover, whereby the latter will resemble the exposed surface of woven carpet and the base will impart weight and flexibility to the floor covering.

9. A carpet floor covering comprising superposed layers, the lower of which is a waterproofed flexible material and the upper layer being a felted fibrous material held in intimate contact with the lower layer by a waterproofing material, whereby the said upper layer will resemble the exposed surface of woven carpet.

10. A carpet floor covering comprising a woven fibrous layer associated therewith and thereover, whereby the latter will resemble the exposed surface of woven carpet and the base will impart weight and flexibility to the floor covering.

JOHN B. CAMPBELL.

CERTIFICATE OF CORRECTION.

Reissue No. 18,582. August 30, 1932.

JOHN B. CAMPBELL.

It is hereby certified that error appears in the printed specification of the above numbered patent requiring correction as follows: Page 3, line 8, claim 10, for the word "woven" read weighted waterproofed base and an unwoven; and that the said Letters Patent should be read with this correction therein that the same may conform to the record of the case in the Patent Office.

Signed and sealed this 30th day of August, A. D. 1938.

Henry Van Arsdale (Seal) Acting Commissioner of Patents.